United States Patent
Chuang et al.

(10) Patent No.: US 11,908,592 B2
(45) Date of Patent: Feb. 20, 2024

(54) FLEXIBLE ELECTRODE AND FABRICATION METHOD THEREFOR

(71) Applicant: National Synchrotron Radiation Research Center, Hsinchu (TW)

(72) Inventors: Wei-Tsung Chuang, Hsinchu (TW); Rong-Hao Guo, Hsinchu (TW); Ming-Jay Deng, Hsinchu (TW)

(73) Assignee: NATIONAL SYNCHROTRON RADIATION RESEARCH CENTER, Hsinchu (TW)

( * ) Notice: Subject to any disclaimer, the term of this patent is extended or adjusted under 35 U.S.C. 154(b) by 359 days.

(21) Appl. No.: 17/165,273

(22) Filed: Feb. 2, 2021

(65) Prior Publication Data
US 2021/0257124 A1 Aug. 19, 2021

(30) Foreign Application Priority Data
Feb. 18, 2020 (TW) ................. 109105232

(51) Int. Cl.
*H01B 1/12* (2006.01)
*B29C 45/00* (2006.01)
(Continued)

(52) U.S. Cl.
CPC ......... *H01B 1/124* (2013.01); *B29C 45/0001* (2013.01); *B29C 45/17* (2013.01);
(Continued)

(58) Field of Classification Search
CPC ........ H01G 11/22; H01G 11/26; H01G 11/86; B29K 2509/02; B29C 45/001; B29C 45/17; H01B 1/122; H01B 1/124
(Continued)

(56) References Cited

U.S. PATENT DOCUMENTS

| 4,557,858 A | 12/1985 | Galloway |
| 2020/0028163 A1* | 1/2020 | Yu .................. H01M 4/587 |

FOREIGN PATENT DOCUMENTS

| CN | 110034279 A * | 7/2019 | ........ H01M 10/0525 |
| CN | 110729138 A | 1/2020 | |

(Continued)

*Primary Examiner* — Tri V Nguyen
(74) *Attorney, Agent, or Firm* — Birch, Stewart, Kolasch & Birch, LLP

(57) ABSTRACT

A flexible electrode and a fabrication method therefor are provided. The flexible electrode is formed by mixing organic-soft-matrix with inorganic-hard-material. The inorganic-hard-material is composed of silicate lamellar blocks and electrochemically active materials. Each of the silicate lamellar blocks is formed by multiple stacked nano-scaled sheet-like silicate lamellae. The organic-soft-matrix includes conductive polymer and binder. The binder is water-soluble and ionically conductive. The flexible electrode has a floor-ramp like opened-perforated layer structure formed by hierarchically aggregated inorganic silicate lamellar blocks, and pores of the opened-perforated layer structure are filled with the organic-soft-matrix, so as to form a network channel structure having organic phase and inorganic phase interlaced with each other. The floor-ramp like opened-perforated layer structure composed of aggregated inorganic silicate lamellar blocks contributes to stiffness of the flexible electrode, and the conductive polymer and the binder in the organic-soft-matrix respectively form electron channels and ion channels in the flexible electrode.

20 Claims, 8 Drawing Sheets

(51) Int. Cl.
    *B29C 45/17*     (2006.01)
    *H01B 1/08*      (2006.01)
    *C25D 5/56*      (2006.01)
    *B29K 509/02*    (2006.01)
    *B29L 31/34*     (2006.01)

(52) U.S. Cl.
    CPC ............... *H01B 1/08* (2013.01); *H01B 1/122* (2013.01); *B29K 2509/02* (2013.01); *B29L 2031/3406* (2013.01); *C25D 5/56* (2013.01)

(58) Field of Classification Search
    USPC ........................................................ 428/138
    See application file for complete search history.

(56) References Cited

FOREIGN PATENT DOCUMENTS

| | | | |
|---|---|---|---|
| JP | 8-279354 A | | 10/1996 |
| JP | 08279354 A | * | 10/1996 |
| JP | 2003-313429 A | | 11/2003 |
| JP | 2014-109018 A | | 6/2014 |
| KR | 20200100961 A | * | 2/2023 |
| TW | 200926478 A | | 6/2009 |

* cited by examiner

FLEXIBLE ELECTRODE AND FABRICATION METHOD THEREFOR

CROSS-REFERENCE TO RELATED APPLICATION

This non-provisional application claims priority under 35 U.S.C. § 119(a) to Patent Application No. 109105232 filed in Taiwan, R.O.C. on Feb. 18, 2020, the entire contents of which are hereby incorporated by reference.

BACKGROUND

Technical Field

The present invention relates to a flexible electrode and a fabrication method thereof, and in particular, to a flexible electrode including inorganic silicate minerals and organic polymers and a fabrication method thereof.

Related Art

In recent years, wearable electronic devices such as a flexible display, an electronic skin, smart clothing, a smart watch, and the like are gradually popular, which are worn on human bodies in direct contact with human clothes and even skins. Therefore, compared with traditional portable electronic devices, safety and non-toxicity of batteries or energy storage elements of such wearable electronic devices need to be further emphasized in addition to energy density.

In addition to non-toxicity of terminal products, current environmental protection issues directly or indirectly urge governments of various countries to continuously promote upgrading of domestic manufacturing industries as the current environmental protection issues ferment in countries around the world with popularity of social media. In other words, not only manufactured products need to be harmless to human bodies, but also lowest energy consumption (low carbon) and least environmental harm are required during the entire manufacturing, which is a great challenge for the manufacturing industry.

SUMMARY

The present invention is intended to improve electrodes of batteries or energy storage elements used in current wearable electronic devices. Compared with the prior art, the present invention has the advantages of lower energy consumption and less environmental harm. In particular, only water is used as a solvent in the present invention without safety concerns for organic solvent residues, and the like.

The flexible electrode provided in the present invention includes an inorganic hard material and an organic soft matrix. The inorganic hard material phase domain includes a plurality of silicate lamellar blocks and a first electrochemically active material. The organic soft matrix includes a conductive polymer and a binder, where the binder is water-soluble and ionically conductive. The plurality of silicate lamellar blocks are aggregated in a dispersing manner to form an open-perforated floor-ramp support structure and embedded in an organic phase, thereby forming a network structure electrode with an inorganic hard material and the organic soft matrix interlaced with each other. Each of the silicate lamellar blocks includes a plurality of stacked silicate lamellae, A stacking direction of the silicate lamellae is substantially parallel to a thickness direction of the electrode.

In some embodiments of the above flexible electrode, a first capacitively active material is adsorbed inside at least a part of the silicate lamellae, where the first capacitively active material is selected from transition metal ions.

In some embodiments of the above flexible electrode, the first capacitively active material is selected from a group composed of the transition metal ions, a transition metal oxide nanoparticles formed by reducing the transition metal ions, and a combination thereof.

In some embodiments of the above flexible electrode, the silicate lamella has a thickness of about 1 nanometer (nm) and an average particle size ranging from 100 nm to 300 nm.

In some embodiments of the above flexible electrode, the binder is selected from a group composed of water-soluble polyelectrolyte polymer materials such as PVA, PEO, PVAC, PVP, and a combination thereof.

In some embodiments of the above flexible electrode, the organic soft material phase domain may further include a second capacitively active material, where the second capacitively active material is selected from a group composed of transition metal nanoparticles, transition metal oxides, and a combination thereof.

In some embodiments of the above flexible electrode, the second capacitively active material is selected from transition metal oxides such as manganese oxides or vanadium oxides.

The fabrication method for a flexible electrode provided in the present invention includes the following steps: (a) providing silicate lamellae, a binder, and a conductive polymeric material, where the content of the silicate lamellae ranges from 25 wt % to 35 wt %, the content of the binder ranges from 15 wt % to 25 wt %, and the content of the conductive polymeric material ranges from 45 wt % to 55 wt %; (b) uniformly dispersing the silicate lamellae in water to form a suspension; (c) uniformly mixing the binder and the conductive polymeric material of step (a) with the suspension of step (b) to form a mixed solution, where a viscosity of the mixed solution ranges from 50 mPa·s to 500 mPa·s; and (d) injecting the mixed solution into a mold, or applying the mixed solution on a template before drying.

In some embodiments of the above fabrication method for a flexible electrode, before step (a), the method further includes: immersing the silicate lamellae in a solution of a salt of a first capacitively active material with a molarity of 1 M; and passing the solution of the salt of the first capacitively active material in which the silicate lamellae are immersed through a screen to obtain silicate lamellar blocks with a first capacitively active ion adsorbed on its surface.

In some embodiments of the above fabrication method for a flexible electrode, the salt of the first capacitively active material is a transition metal salt.

In some embodiments of the above fabrication method for a flexible electrode, a salt of a second capacitively active material is selected from manganate, vanadate, or a mixture of manganate and vanadate.

In some embodiments of the above fabrication method for a flexible electrode, an average particle size of the silicate lamella ranges from 100 nm to 400 nm.

In some embodiments of the above fabrication method for a flexible electrode, the silicate lamellae are immersed in the solution of the first capacitively active material at a room temperature for more than 12 hours, where duration depends on cationic exchange capacity.

In some embodiments of the above fabrication method for a flexible electrode, the binder is selected from a group composed of PVA, PEO, PVAC, PVP, and a combination thereof.

In some embodiments of the above fabrication method for a flexible electrode, after step (d), the method further includes: adding a second capacitively active material to the organic soft matrix through electroplating.

In some embodiments of the above fabrication method for a flexible electrode, the second capacitively active material is selected from the transition metal oxides such as manganese oxides or vanadium oxides.

DETAILED DESCRIPTION

Figure 1:
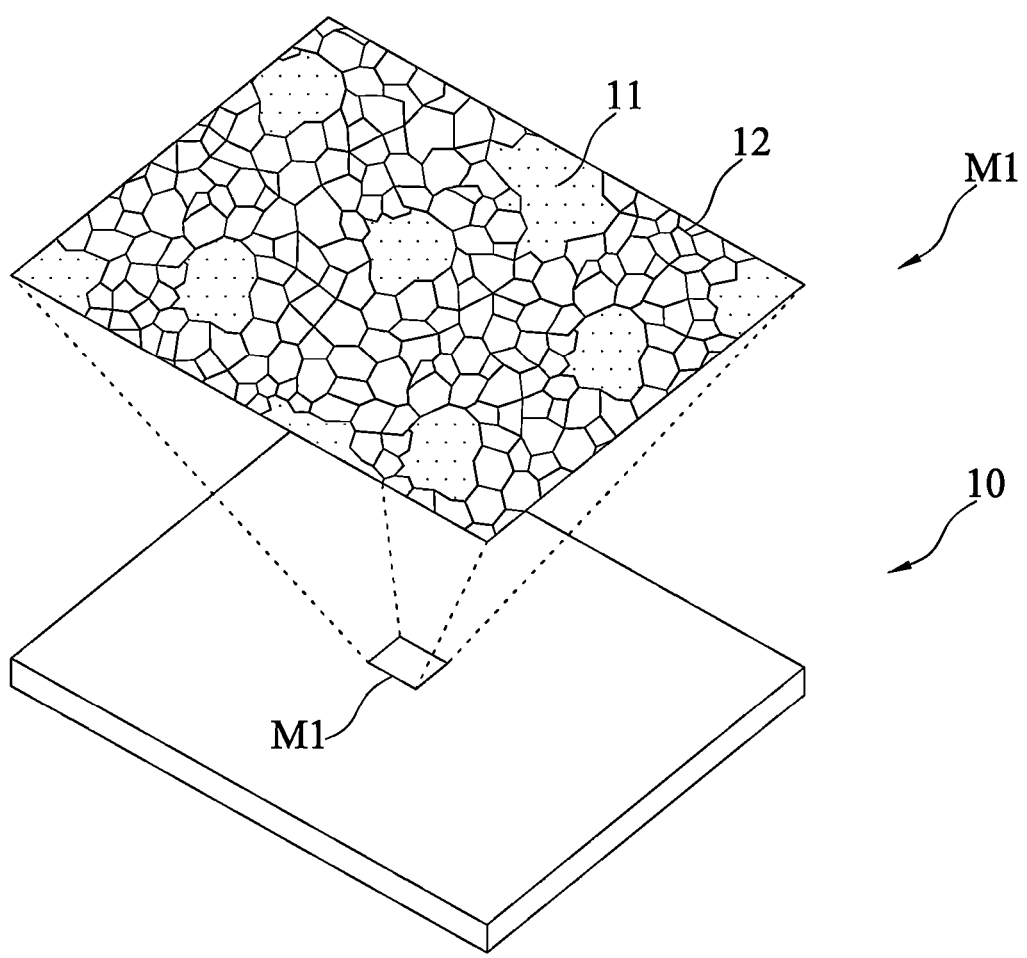
FIG. 1 is a schematic diagram (1) of a microstructure of a flexible electrode according to a first embodiment of the present invention.

In the following embodiments, "up" or "down" is merely used to illustrate an orientation shown in the drawings instead of limiting an actual orientation.

Inorganic flaky materials (for example, silicate minerals such as clay and mica abounding in the earth's crust) have a small thickness but irregular shapes in common.

In a formula of the present invention, a mixed suspension includes organic-phase materials (a conductive polymer and a binder) and inorganic flaky materials (for example, silicate minerals such as clay and mica abounding in the earth's crust) mixed with each other. During evaporation of solvents in the mixed suspension, the organic materials and the inorganic flaky materials are aggregated to form microphase separated domains, that is, inorganic-rich-phase domains and organic-rich-phase domains.

In the inorganic-rich-phase domains, most silicate lamellae stacked face-to-face to form irregular lamellar blocks, that is, after flaky particles are aggregated through stacking, a stacking direction of the flaky particles is substantially parallel to a thickness direction of the matrix of the electrode. In addition, since it is observed under a microscope that a few of the lamellar blocks are vertically or obliquely inserted between adjacent lamellar blocks to form a three-dimensional open-perforated layer structure. The three-dimensional open-perforated layer structure may be equivalent to a floor and ramp structure of a parking building, that is, floors (layers) are connected to each other through a plurality of ramps. The structure contributes to prevention of a fracture of the whole structure caused by expansion of stress along a specific plane, so that mechanical strength of the whole structure is improved. Moreover, such interconnected floor-ramp like structure can provide a network path for a first active material adsorbed in the lamellar blocks to transfer electrical energy generated by electrochemical redox reactions.

In addition to the inorganic-phase domains formed by the aggregated silicate lamellar blocks, the microphase separation causes the organic phase domains to fill the three-dimensional open-perforated layer structure formed by the silicate lamellar blocks, to form a network structure having the organic-phase domains and the inorganic-phase domains interlaced with each other. The network structure through which the conductive polymer and the binder (polyelectrolyte) in the organic-phase domains pass in this way provides channels for transferring electrons and ions. Since such flaky particles a present small thickness but irregular shapes in common, some of the flaky particles are vertical or are obliquely inserted between other particles when such structure formed by stacked silicate minerals is observed by using a microscope. However, such stacking may be regarded as face-to-face stacking as long as the structure appears to be a multi-layer stacking structure as a whole. In addition, a few of the flaky particles which are vertical or are obliquely inserted between other particles further contribute to prevention of a fracture of the whole structure caused by expansion of stress along a specific plane, so that the mechanical strength of the whole structure is improved.

Figure 2:
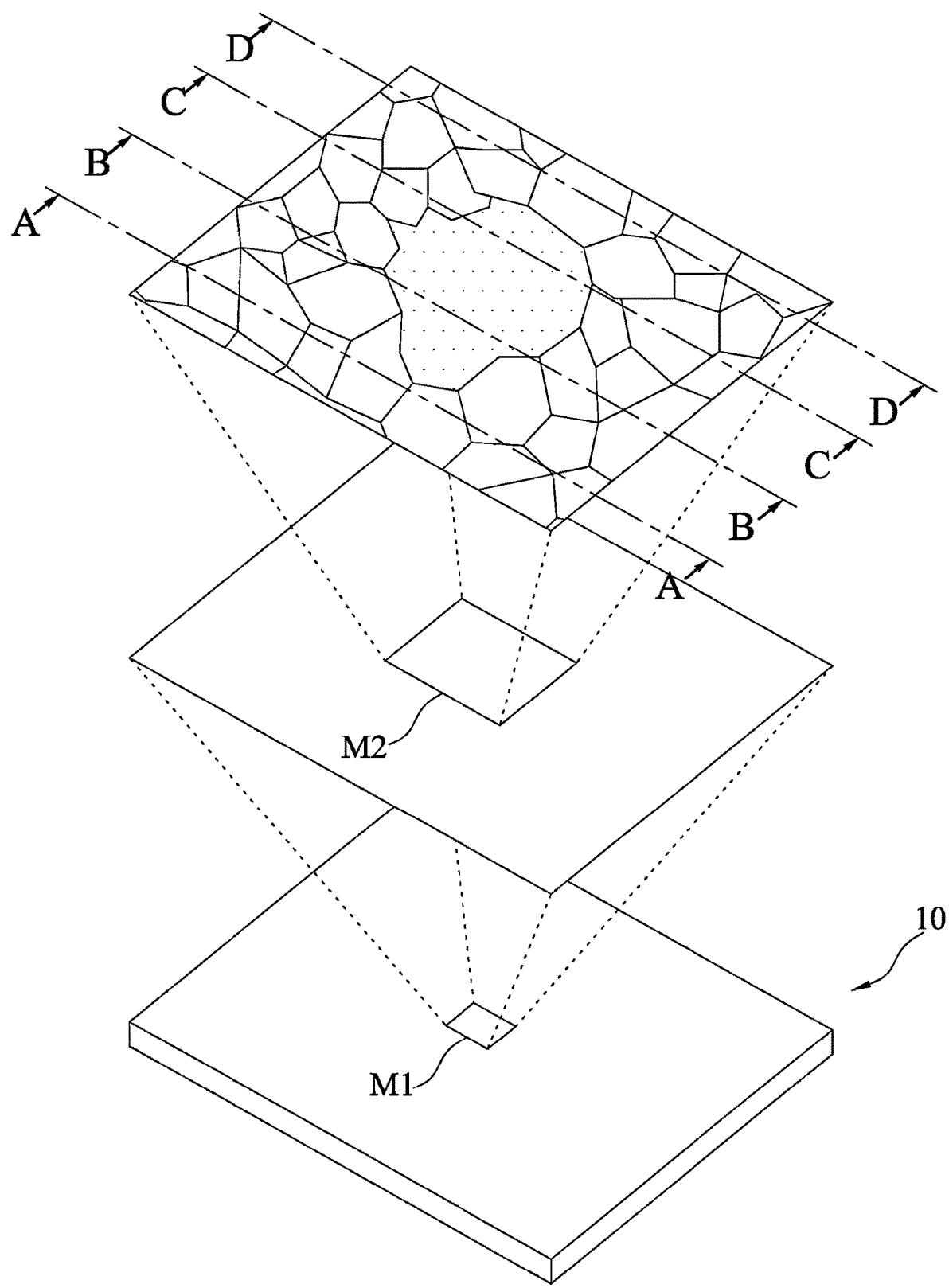
FIG. 2 is a schematic diagram (2) of a microstructure of a flexible electrode according to a first embodiment of the present invention.
Figure 3A:
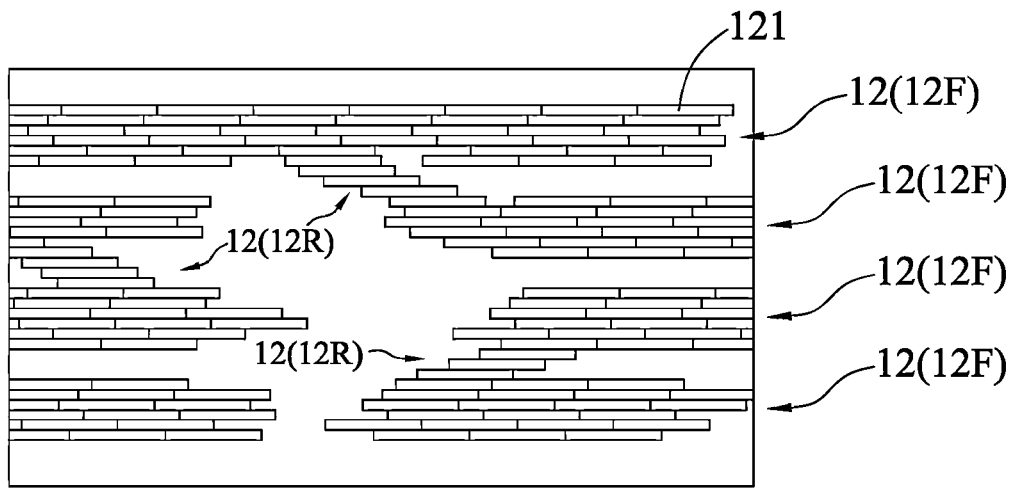
FIG. 3A is a schematic cross-sectional view along line A-A in FIG. 2.
Figure 3B:
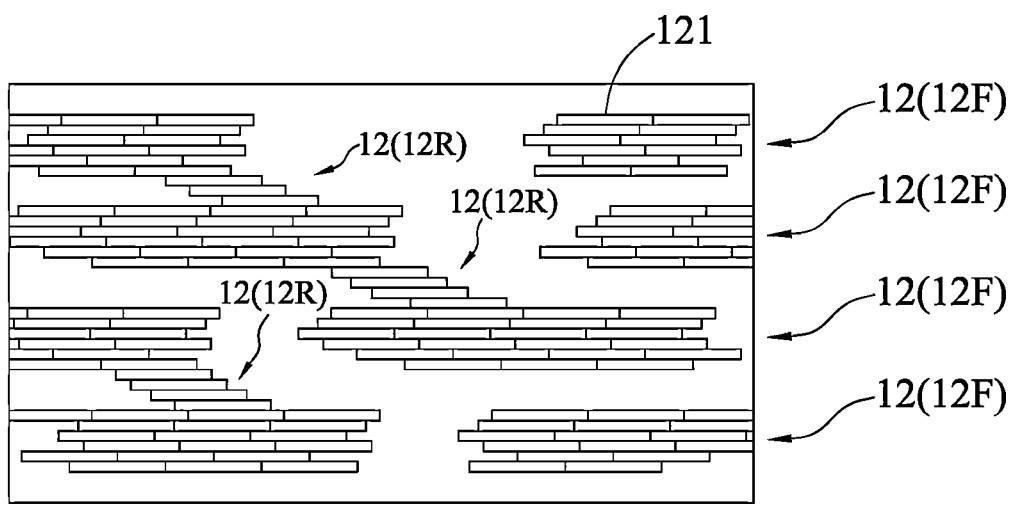
FIG. 3B is a schematic cross-sectional view along line B-B in FIG. 2.
Figure 3C:
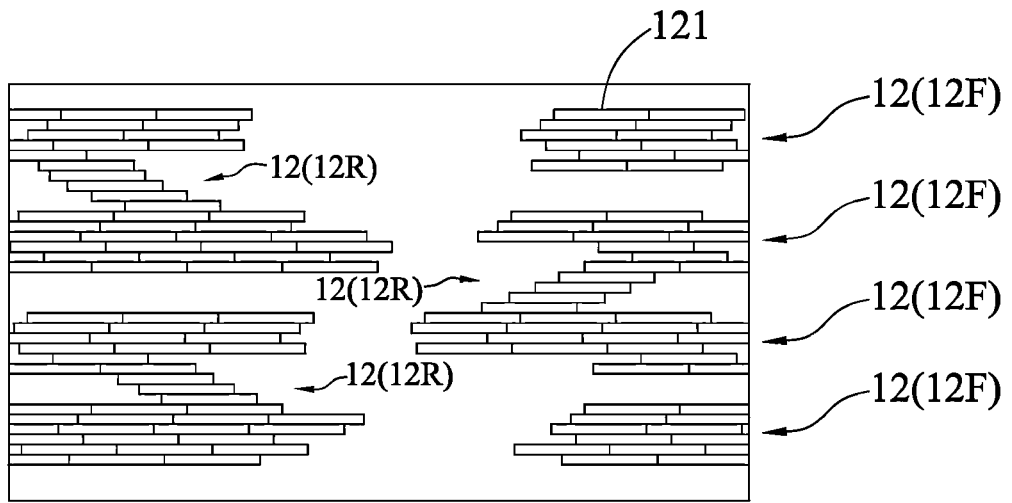
FIG. 3C is a schematic cross-sectional view along line C-C in FIG. 2.
Figure 3D:
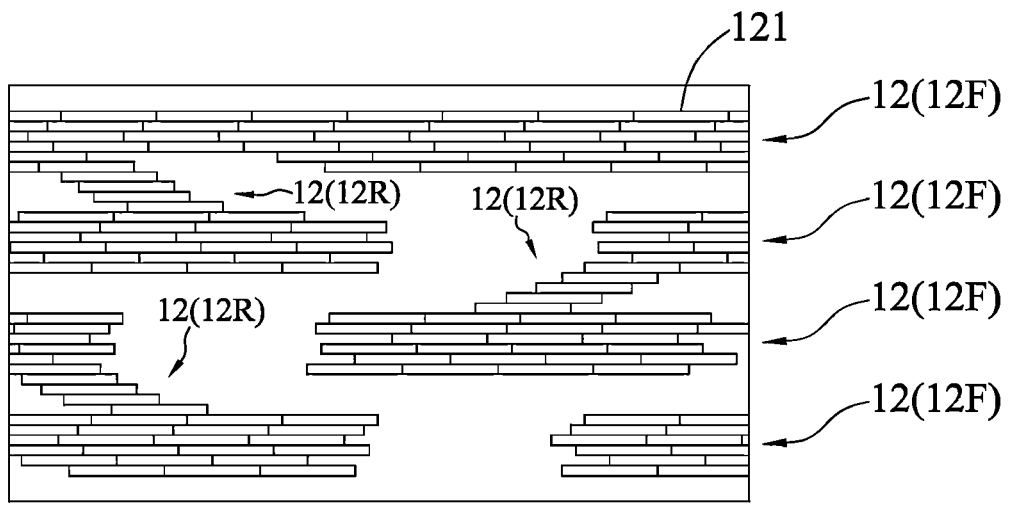
FIG. 3D is a schematic cross-sectional view along line D-D in FIG. 2.

FIG. 1 and FIG. 2 are respectively a schematic diagram (1) and a schematic diagram (2) of a microstructure of a flexible electrode according to a first embodiment of the present invention, which illustrate an exemplary flexible electrode 10 and a surface interior. The flexible electrode 10 in this embodiment includes an organic soft matrix (an organic-phase domains) 11 and a plurality of silicate lamellar blocks (an inorganic-phase domains) 12. The organic soft matrix (the organic-phase domains) 11 is mainly composed of a conductive polymer (for example, PEDOT:PSS, PANI, or PPY) and a binder. The binder (for example, PVA, PEO, PAMM, PVAC, or PVP) used in this embodiment is water-soluble and ionically conductive. FIG. 3A to FIG. 3D show interiors of cross-sections of different positions (lines AA, BB, CC, and DD marked in FIG. 2) on an exemplary flexible electrode 10. Each of the silicate lamellar blocks 12 is composed of a plurality of stacked silicate lamellae 121. A direction (shown in FIG. 3A to FIG. 3D) of the silicate lamellae 121 is substantially parallel to a thickness direction of the flexible electrode 10. The silicate lamellar blocks (the inorganic-phase domains) 12 are hierarchically aggregated and embedded in the organic soft matrix (the organic-phase domains) 11, so that all of the silicate lamellar blocks (the inorganic-phase domains) 12 are within the organic soft matrix (the organic-phase domains) 11, that is, perforations of the open-perforated layer structure are filled with the organic soft matrix (the organic-phase domain) 11. By virtue of the silicate lamellar blocks (the inorganic-phase domains) 12 and the organic soft matrix (the organic-phase domains) 11 interlaced with each other and support of the organic soft matrix (the organic-phase domains) 11, a whole floor-ramp like opened-perforated layer structure is formed. As shown in FIG. 3A to FIG. 3D, a floor is composed of silicate lamellar blocks 12F that horizontally extend, and a ramp is equivalent to silicate lamellar blocks 12R obliquely stacked in the figure.

The silicate lamellar blocks 12 may be clusters not connected to each other or opened-perforated networks connected to each other. The expression "not connected to each other" means that the silicate lamellar blocks (the inorganic-phase domains) 12 are dispersed in the organic soft matrix (the organic-phase domains) 11 in an isolated manner and are embedded in the organic soft matrix (the organic-phase domains) 11 without a direct connection between each other. The expression "connected to each other" means that all of the silicate lamellar blocks (the inorganic-phase domains) 12 are not isolated and the silicate lamellar blocks (the inorganic-phase domains) 12 are directly connected to each other to form a floor-ramp opened-perforated layer structure. In the embodiments of the flexible electrode 10 of the present invention, when the silicate lamellar blocks (the inorganic-phase domains) 12 are distributed in a disconnected manner, flexibility is the best, but mechanical strength is poor. When the silicate lamellar blocks (the inorganic-phase domains) 12 are distributed in a connected manner, not only flexibility is good, but also mechanical strength is good. The two distributions of the silicate lamellar blocks (the inorganic-phase domains) 12 may be achieved by adjusting a weight percentage of the silicate lamellae 121 relative to the conductive polymer and the binder, to meet different application environments. It should be particularly noted that, in any of the above distributions, the organic soft matrix (the organic-phase domain) 11 in the entire flexible electrode 10 is completely cut off by the opened-perforated layer structure constructed by the silicate lamellar blocks (the inorganic-phase domains) 12 in neither a horizontal direction nor a vertical direction, that is, the opened-perforated layer structure constructed by the silicate lamellar blocks (the inorganic-phase domains) 12 and the organic soft matrix (the organic-phase domains) 11 jointly form a network structure. Therefore, the flexible electrode 10 has an omnidirectional conductive path and has no directionality. It should be particularly noted that, in this embodiment, the silicate lamellar blocks (the inorganic-phase domains) 12 and the organic soft matrix (the organic-phase domains) 11 can be observed simultaneously in a cross-section of any position on the flexible electrode 10. The only difference is that area proportions of the inorganic-phase domains and the organic-phase domains vary with a position of a cross-section. Therefore, the flexible electrode 10 is conductive in both horizontal and vertical directions.

Figure 7:
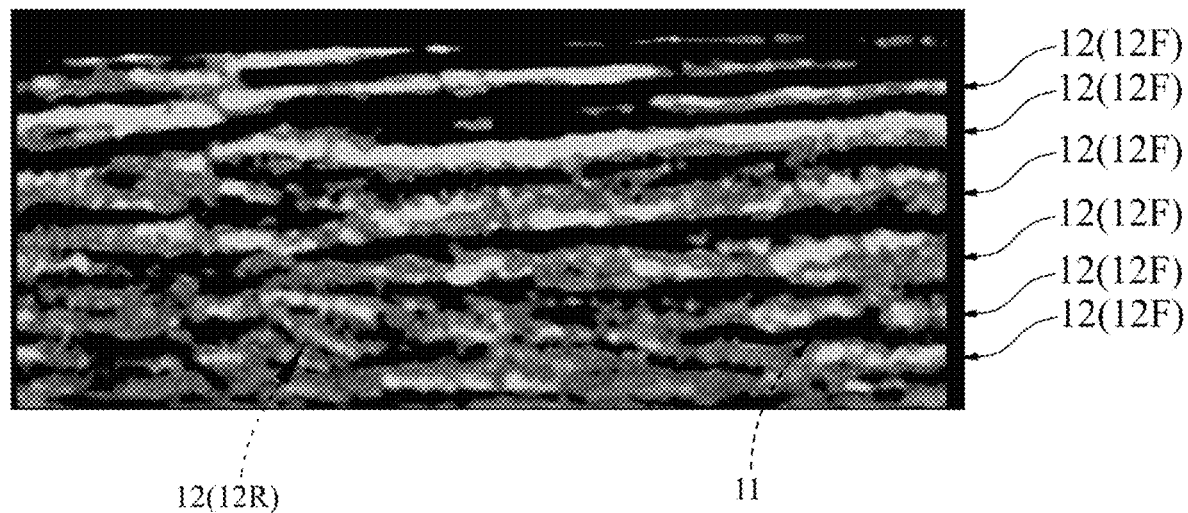
FIG. 7 is a cross-sectional view of a flexible electrode imaged through X-ray microscopy according to the present invention.

It should be particularly noted that although the silicate lamellae 121 in FIG. 3A to FIG. 3D seem to be in direct contact, in fact, organic soft matrix 11 are filled between the silicate lamellae 121. For a specific cross-sectional structure of the flexible electrode 10, refer to FIG. 7, which is a cross-sectional view of an electrode obtained by analyzing the flexible electrode of the present invention through X-ray microscopy. Black parts (dark parts) are organic soft matrix (organic-phase domains) 11 and white parts (light parts) are silicate lamellar blocks (inorganic-phase domains) 12. The silicate lamellar blocks (the inorganic-phase domains) 12 further include a floor part composed of silicate lamellar blocks 12F that horizontally extend and a ramp part composed of obliquely stacked silicate lamellar blocks 12R.

Figure 4:
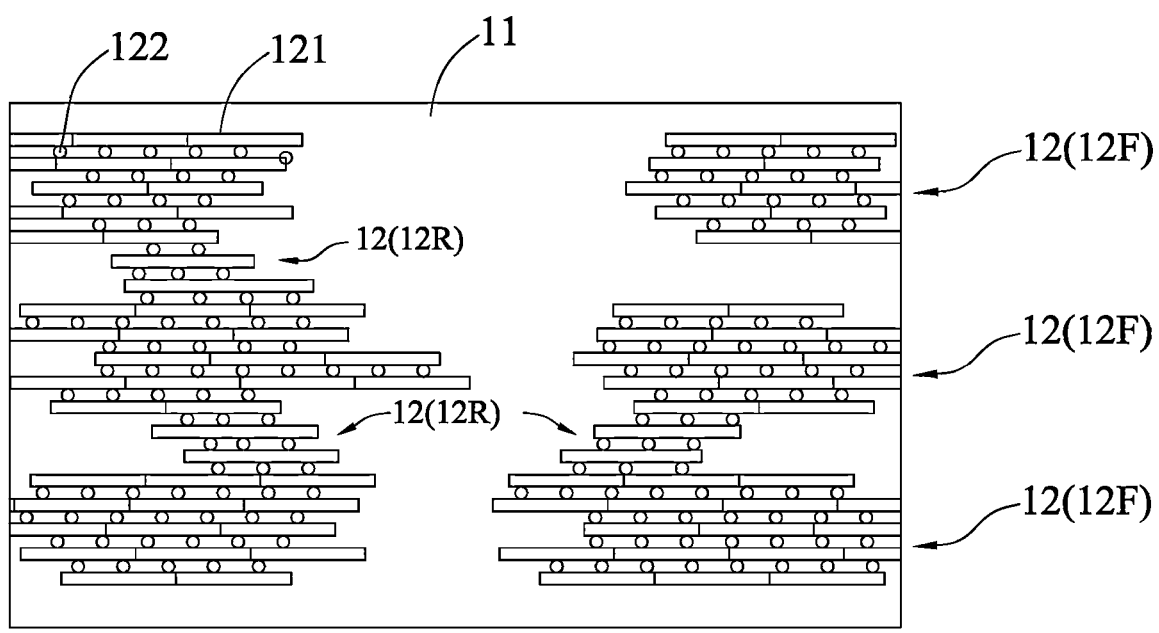
FIG. 4 is a schematic cross-sectional view according to a second embodiment of the present invention, which illustrates that a first capacitively active material is adsorbed between silicate lamellae.

As shown in FIG. 4, in a second embodiment, first capacitively active materials 122 are adsorbed between at least a part of the silicate lamellae 121. The first capacitively active materials 122 are selected from transition metal ions (such as iron, cobalt, nickel, and the like, or a mixture thereof), especially from nitrate, sulfate, acetate or chloride of a transition metal.

Figure 5:
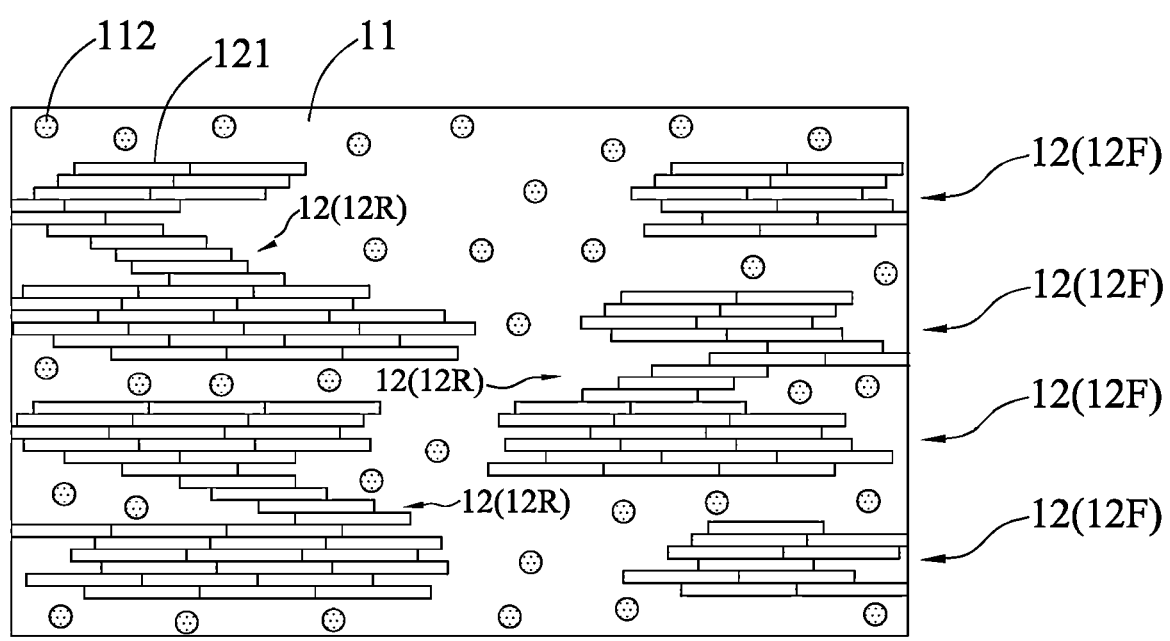
FIG. 5 is a schematic cross-sectional view according to third second embodiment of the present invention, which illustrates that an organic soft matrix includes a second capacitively active material.

As shown in FIG. 5, in a third embodiment, the organic soft matrix (the organic phase domain) 11 further includes second capacitively active materials 112. The second capacitively active materials 112 are selected from transition metal nanoparticles and transition metal oxide particles, such as manganese oxides, cobalt oxides, vanadium oxides, or the like.

Figure 6:
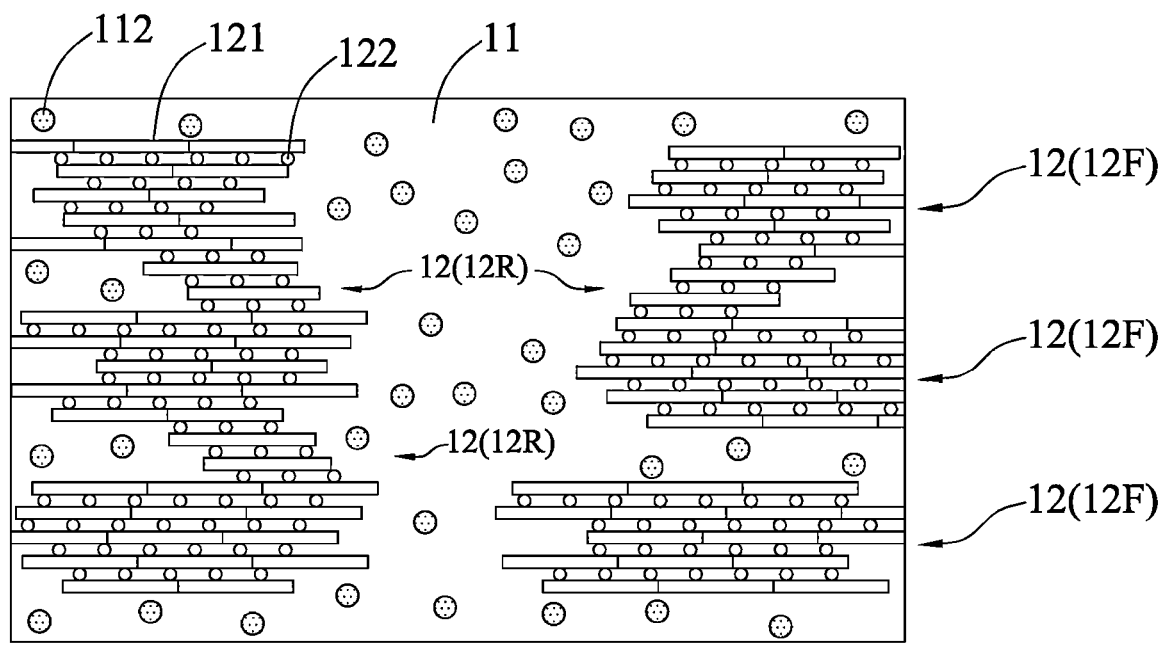
FIG. 6 is a schematic cross-sectional view according to a fourth embodiment of the present invention, which illustrates that a first capacitively active material is adsorbed between silicate lamellae, and an organic soft matrix includes a second capacitively active material.

As shown in FIG. 6, in a fourth embodiment, first capacitively active materials 122 are adsorbed between at least a part of the silicate lamellae 121, and the organic soft matrix (the organic-phase domains) 11 further includes second capacitively active materials 112. The first capacitively active materials 122 are selected from transition metal ions (such as iron, cobalt, nickel, and the like, or a mixture thereof) or reduced transition metal oxide nanoparticles. The second capacitively active materials 112 are selected from transition metal particles and transition metal oxide particles such as manganese oxides, vanadium oxides, or the like.

In the embodiments, an average particle size of the silicate lamellae 121 constituting each of the silicate lamellar blocks 12 ranges from 100 nm to 400 nm. The above particle size range is measured by a particle size laser analyzer through dynamic light scattering, and a model of the particle size laser analyzer used in this experiment is MALVERN Nano-S.

Fabrication Method for a Flexible Electrode

The method for preparing the flexible electrode of the present invention is described below. It should be emphasized that the following formula and the fabrication method are merely examples, and it does not mean that the flexible electrode of the present invention can only be implemented according to the following steps.

First, silicate lamellae, a binder (for example, PVA), and a conductive polymeric material (for example, PEDOT:PSS) are prepared. A formula is as follows:

|  | Silicate lamellae (wt %) | PVA (wt %) | PEDOT:PSS (wt %) |
| --- | --- | --- | --- |
| Formula 1 | 20 | 20 | 60 |
| Formula 2 | 30 | 20 | 50 |
| Formula 3 | 40 | 20 | 40 |
| Formula 4 | 30 | 10 | 60 |
| Formula 5 | 40 | 10 | 50 |
| Formula 6 | 20 | 30 | 50 |
| Formula 7 | 30 | 30 | 40 |

After the materials are prepared according to the proportions in the above formula, the silicate lamellae (at a proportion of about 3-5 wt %) is first added to water, and particle sizes of the lamellae are uniformly dispersed to hundreds of nanometers through ultrasonic vibration to form a suspension. Then PVA and PEDOT:PSS are dissolved in the suspension of the silicate lamellae through stirring and/or ultrasonic vibration to form a mixed solution. A viscosity of the mixed solution is controlled within a range of 50 mPa·s to 500 mPa·s. Finally, the suspension of the silicate lamellae is injected into a mold or applied on a template according to requirements for shapes, and then left for 24 hours to dry naturally. After drying, the mold or template is removed to obtain the flexible electrode of the present invention. Based on a premise of environmental processing, chemical organic solvents are not considered in the present invention.

In the above formula, the content of silicate lamellae in formula 1 and formula 6 is relatively small. By observing the flexible electrode sample formulated by using the formulas through an electron microscope and transmission X-ray microscopy, it can be found that most silicate lamellar blocks (the inorganic-phase domain) are scattered in an isolated manner and embedded in the organic soft matrix (the organic-phase domain).

The content of silicate lamellae in formula 3 and formula 5 is relatively large. By observing cross-sections of the flexible electrode samples made by using the formulas through the electron microscope and transmission X-ray microscopy, it can be found that most silicate lamellar blocks are connected to each other.

The content of silicate lamellae in formulas 2, 4, 7 is moderate. By observing the flexible electrode samples made by using the formulas through the electron microscope and transmission X-ray microscopy, it can be found that some of the silicate lamellar blocks are isolated from each other, and other parts of the silicate lamellar blocks are connected to each other.

In some embodiments, before the silicate lamellae is mixed with an aqueous solution of PVA and PEDOT:PSS, the silicate lamellae may be first immersed in a solution of a salt (for example, a transition metal salt such as nitrate, sulfate, acetate, or chloride) of a first capacitively active material with a concentration of 1 M at a room temperature for more than 12 hours (which is related to a pH value and a temperature), and then the solution of the salt of the first capacitively active material in which the silicate lamellae are immersed is passed through a screen or the solution is centrifuged to obtain the silicate lamella with a first capacitively active material ion (such as a transition metal ion) adsorbed on its surface. The flexible electrode made of such silicate lamellae with the first capacitively active material adsorbed on its surface is shown in the second embodiment of FIG. 4.

In the second embodiment, after the flexible electrode shown in FIG. 4 is fabricated, a second capacitively active material may be further added into the organic soft matrix of the flexible electrode through electroplating (for example, with 1 coulomb of power per second), to obtain the flexible electrode shown in the fourth embodiment of FIG. 6. The expression "electroplating" is to put the flexible electrode into a sulfuric acid solution with a molarity of 4M and ultrasonically vibrate the solution for 10 minutes to clean a surface. After being cleaned and dried, the flexible electrode may be soaked in a solution of a transition metal salt, and a voltage is applied to the flexible electrode so that the capacitively active material is deposited and added into the flexible electrode.

In the first embodiment, after the flexible electrode shown in FIG. 3A to FIG. 3D is fabricated, a second capacitively active material may also be added into the organic soft matrix of the flexible electrode through electroplating, to obtain the flexible electrode shown in the third embodiment of FIG. 5.

Based on the above, adding the first capacitively active materials and/or the second capacitively active materials into the flexible electrode enables the flexible electrode to serve as an electrode of a super capacitor. For example, a flexible supercapacitor may be fabricated by separating two flexible electrodes of the present invention from each other with a polymer solid electrolyte. The polymer solid electrolyte described herein may be the electrolyte disclosed in Patent No. I611442 of the Republic of China (Taiwan), but the present invention is not limited thereto.

No organic solvent is used in the fabrication process of the flexible electrode provided in the present invention, and the selected silicate flaky material is a natural mineral abounding in nature. Therefore, the product is non-toxic and quite applicable to wearable electronic devices. In addition, the fabrication process also meets requirements for environmental protection.

Since a size of the silicate lamella is actually extremely tiny, the silicate lamella in the drawing is not drawn to the actual scale for convenience of drawing of the microstructure of the flexible electrode.

Although the present invention is disclosed in the above by using embodiments, the embodiments are not intended to limit the present invention. Anyone having ordinary knowledge in the technical field can make some changes and refinements without departing from the spirit and scope of the present invention. Therefore, the protection scope of the present invention is subject to that defined by the attached claims.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

Notes on abbreviations of chemical materials
PEDOT:PSS: Poly(3,4-ethylenedioxythiophene):Poly (styrene sulfonate)
PANI Polyaniline
PPY: Polypyrrole
PVA: Poly (vinyl alcohol)
PEO: Polyethylene oxide
PAMM: Polyacrylamide
PVAC: Poly(vinyl acetate)
PVP: Poly(vinyl pyrrolidone)

What is claimed is:
1. A flexible electrode, comprising:
an organic soft matrix comprising a conductive polymer and a binder, wherein the binder is water-soluble and ionically conductive; and
an inorganic hard material comprising an opened-perforated layer structure formed by a plurality of aggregated silicate lamellar blocks, wherein the organic soft matrix is filled in open pores of the opened-perforated layer structure to form a three-dimensional network structure having an organic phase domain and an inorganic phase domain interlaced with each other, and each of the aggregated silicate lamellar blocks comprises a plurality of silicate lamellae, wherein the silicate lamellae are stacked face-to-face in a stacking direction parallel to a thickness direction of the organic soft matrix;
wherein a content of the silicate lamellae ranges from 25 wt % to 35 wt %, a content of the binder ranges from 15 wt % to 25 wt %, and a content of the conductive polymer ranges from 45 wt % to 55 wt %.
2. The flexible electrode according to claim 1, wherein a first capacitively active material is adsorbed on a surface of at least a part of the silicate lamellae, wherein the first capacitively active material is transition metal ions.
3. The flexible electrode according to claim 2, wherein the first capacitively active material is selected from a group composed of transition metal nitrate, transition metal sulfate, transition metal acetate, transition metal chloride, and a combination thereof.

4. The flexible electrode according to claim 3, wherein the organic soft matrix further comprises a second capacitively active material, wherein the second capacitively active material is transition metal oxide particles.

5. The flexible electrode according to claim 4, wherein the second capacitively active material is selected from a group composed of manganese oxide particles, cobalt oxide particles, vanadium oxide particles, and a combination thereof.

6. The flexible electrode according to claim 1, wherein an average particle size of the silicate lamellae ranges from 100 nm to 400 nm.

7. The flexible electrode according to claim 1, wherein the binder is selected from a group composed of vinyl alcohol, polyethylene oxide, polyacrylamide, poly vinyl acetate, poly vinyl pyrrolidone, and a combination thereof.

8. The flexible electrode according to claim 1, wherein the organic soft matrix further comprises a second capacitively active material, wherein the second capacitively active material is transition metal oxide particles.

9. The flexible electrode according to claim 8, wherein the second capacitively active material is selected from a group composed of manganese oxide particles, cobalt oxide particles, vanadium oxide particles, and a combination thereof.

10. A fabrication method for the flexible electrode of claim 1, the method comprising:
    (a) providing the silicate lamellae, the binder, and the conductive polymer;
    (b) uniformly dispersing the silicate lamellae in water to form a suspension;
    (c) uniformly mixing the binder and the conductive polymer of step (a) with the suspension of step (b) to form a mixed solution, wherein a viscosity of the mixed solution ranges from 50 mPa·s to 500 mPa·s; and
    (d) injecting the mixed solution into a mold or applying the mixed solution on a template before drying.

11. The fabrication method for the flexible electrode according to claim 10, wherein before step (a), the method further comprises:
    immersing the silicate lamellae in a 1 M aqueous solution of a salt of a first capacitively active material; and
    passing the aqueous solution of the salt of the first capacitively active material in which the silicate lamellae are immersed through a screen or centrifuging the aqueous solution to obtain silicate lamellar blocks on which first capacitively active ions are adsorbed.

12. The fabrication method for the flexible electrode according to claim 11, wherein the salt of the first capacitively active material is a transition metal salt.

13. The fabrication method for the flexible electrode according to claim 12, wherein the first capacitively active material is selected from a group composed of transition metal nitrate, transition metal sulfate, transition metal acetate, transition metal chloride, and a combination thereof of.

14. The fabrication method for the flexible electrode according to claim 13, wherein after step (d), the method further comprises: adding a second capacitively active material to the binder through electroplating.

15. The fabrication method for the flexible electrode according to claim 14, wherein the second capacitively active material is selected from a group composed of manganese oxide, cobalt oxide, vanadium oxide, and a combination thereof.

16. The fabrication method for the flexible electrode according to claim 11, wherein the silicate lamellae are immersed in the aqueous solution of the salt of the first capacitively active material at a room temperature for more than 12 hours.

17. The fabrication method for the flexible electrode according to claim 10, wherein an average particle size of the silicate lamellae ranges from 100 nm to 400 nm.

18. The fabrication method for the flexible electrode according to claim 10, wherein the binder is selected from a group composed of vinyl alcohol, polyethylene oxide, polyacrylamide, poly vinyl acetate, poly vinyl pyrrolidone, and a combination thereof.

19. The fabrication method for the flexible electrode according to claim 10, wherein after step (d), the method further comprises: adding a second capacitively active material to the binder through electroplating.

20. The fabrication method for the flexible electrode according to claim 19, wherein the second capacitively active material is selected from a group composed of manganese oxide, cobalt oxide, vanadium oxide, and a combination thereof.

* * * * *